(12) United States Patent
Howard et al.

(10) Patent No.: US 10,667,077 B2
(45) Date of Patent: May 26, 2020

(54) USER CONSENT FOR HYBRID LOCATION SHARING SERVICES

(71) Applicant: Avast Software s.r.o., Prague (CZ)

(72) Inventors: Virginia Howard, Oakland, CA (US); Dan Hodges, Oakland, CA (US)

(73) Assignee: Avast Software s.r.o., Prague (CZ)

( * ) Notice: Subject to any disclaimer, the term of this patent is extended or adjusted under 35 U.S.C. 154(b) by 0 days.

(21) Appl. No.: 16/024,606

(22) Filed: Jun. 29, 2018

(65) Prior Publication Data

US 2019/0007790 A1 Jan. 3, 2019

Related U.S. Application Data (60) Provisional application No. 62/527,664, filed on Jun. 30, 2017.

(51) Int. Cl.
*H04L 29/08* (2006.01)
*H04W 4/02* (2018.01)

(52) U.S. Cl.
CPC ............... *H04W 4/02* (2013.01); *H04L 67/18* (2013.01)

(58) Field of Classification Search
CPC .................................. H04W 4/02; H04L 67/18
See application file for complete search history.

(56) References Cited

U.S. PATENT DOCUMENTS

| | | | |
|---|---|---|---|
| 7,953,420 B2 * | 5/2011 | Boeiro | G01S 19/48 455/456.2 |
| 2009/0323972 A1 | 12/2009 | Kohno et al. | |
| 2012/0166531 A1 * | 6/2012 | Sylvain | H04L 51/043 709/204 |
| 2013/0104035 A1 * | 4/2013 | Wagner | H04W 4/029 715/240 |
| 2014/0066018 A1 | 3/2014 | Zhu | |
| 2015/0181380 A1 | 6/2015 | Altman et al. | |
| 2015/0350600 A1 | 12/2015 | Beinlich et al. | |
| 2016/0112871 A1 * | 4/2016 | White | H04W 12/06 726/4 |
| 2016/0188307 A1 | 6/2016 | Reagan et al. | |

\* cited by examiner

*Primary Examiner* — Joseph E Dean, Jr.
(74) *Attorney, Agent, or Firm* — Erickson Kernell IP, LLC (57) ABSTRACT

A hybrid location service maintains a user state for each of a plurality of mobile devices communicably coupled to the hybrid location service via one or more networks. The hybrid location service can receive a request for a location of a mobile device. In response, the hybrid location service can determine a consent source. The consent source can include the mobile device or a network operator of the network used by the mobile device. The hybrid location service determines a response to the request for the location of the mobile device based, at least in part, on a user state of the mobile device and a user consent obtained from the consent source.

21 Claims, 5 Drawing Sheets

USER CONSENT FOR HYBRID LOCATION SHARING SERVICES

CROSS-REFERENCE TO RELATED APPLICATIONS

This Application claims priority to U.S. Provisional Patent Application Ser. No. 62/527,664, filed on Jun. 30, 2017, entitled "User Consent for Hybrid Location Sharing Services," the entire disclosure of which is incorporated herein by reference.

FIELD

The disclosure relates generally to mobile devices, and more particularly, to determining user consent for hybrid location sharing services.

BACKGROUND

Since their introduction, the use of mobile telephones has grown to the point where mobile telephones are almost ubiquitous. In many cases, users have replaced traditional landline telephones with mobile telephones.

Location sharing services are software products designed to enable people to share their location with another person or entity, with a group of people or entities, or with themselves for their own viewing. This location information is typically derived from the location of a mobile phone or similar device using a variety of techniques. As an example, Sprint Family Locator, Family Locator by Verizon, AT&T FamilyMap®, T Mobile FamilyWhere® are examples of such products, tailored to families, where the focus is on giving parents a user interface to view the location of their families' phones.

The variety of approaches these services use to determine the location of participants' devices can be generally broken into two categories: network-based location techniques vs. client-based location techniques. Network-based location techniques typically rely on existing network and device infrastructure to remotely query location information, while client-based location techniques typically rely on information made available at the operating system (OS) level to locally installed apps. Network-based location techniques do not generally require the installation of a new app on the sharing person's device, while client-based location techniques generally do.

Because location information can be considered sensitive, obtaining consent is an important theme for location sharing services.

SUMMARY OF THE INVENTION

A hybrid location service maintains a user state for each of a plurality of mobile devices communicably coupled to the hybrid location service via one or more networks. The hybrid location service can receive a request for a location of a mobile device. In response, the hybrid location service can determine a consent source. The consent source can include the mobile device or a network operator of the network used by the mobile device. The hybrid location service determines a response to the request for the location of the mobile device based, at least in part, on a user state of the mobile device and a user consent obtained from the consent source.

BRIEF DESCRIPTION OF THE DRAWINGS

For a better understanding of the inventive subject matter, reference may be made to the accompanying drawings in which.

DETAILED DESCRIPTION

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

The systems and methods described herein can utilize consent models for different location techniques to determine a consent state for a hybrid location sharing service. For example, two generally used location techniques are network-based location techniques and client-based location techniques. An overview of these two techniques will now be provided.

Network-Based Location

As noted above, network-based location typically does not require that a participating user install any new app on their mobile device. Instead, the mobile device's location is determined via one of several techniques that usually involve cooperation with whichever mobile operator is providing network connectivity for that particular mobile device. For example, a phone's location can be approximated by triangulating signal strength or round trip signal times between the mobile device and one or multiple nearby cell signal towers (e.g., cell signal towers 126, FIG. 1), with or without additional assistance from firmware on the mobile device.

When network-based location requires the cooperation of a mobile service operator, consent to locate the mobile device in question is typically given by the account holder, e.g. whoever pays for and manages that mobile device's connectivity via the mobile service operator. This may or may not be the same person who is in possession of the mobile device in question, and may or may not be the same person who is most motivated to obtain the consent. As an illustrative example of the consent issues involved, imagine that a father would like to use a network-based family locator service to see the location of his child's phone, but must first obtain the consent of the mother who pays the mobile service operator for the child's mobile device's network connectivity and serves as the account holder for billing and consent purposes.

The fact that network-based location techniques can typically determine location information for a mobile device without installing new software on the mobile device is seen as desirable in certain circumstances, as is the simple and centralized consent model utilized (e.g., consent of the account holder).

Compared to client-based location techniques, network-based location is generally understood to generally have poorer performance. Network-based location often has longer latency, worse precision, and lower granularity. In addition, the lack of any direct consent mechanism for the device holder (as opposed to the account holder) can be undesirable in certain circumstances. For example, a child or spouse of the account holder may be reluctant to participate in a family locator service if they don't feel they have any direct control over the sharing of their location. Some network-based location sharing services provide an additional user interface (UI) to allow mobile device holders some control over the sharing of their location, either with an app, web, short message service (SMS) or similar interface, with the account holder's implicit consent.

Client-Based Location

In contrast to network-based location techniques, client-based (also referred to as device-based) location techniques typically work by installing an app on the mobile device in question. This app in turn can then report the location of that mobile device, periodically and/or upon an asynchronous request coming from a server or other device. The app typically gets this location information from application program interfaces (APIs) provided by the mobile device's operating system (OS).

Because client-based location typically involves installing an app on the mobile device in question, in theory and in practice, consent to locate that mobile device is typically given by the device holder, e.g. whoever is in possession of the mobile device and is responsible for customizing its operation to their liking. This may or may not be the same person who purchased the mobile device, may or may not be the same person who pays for the mobile device's network connectivity, and may or may not be the person who is most motivated to obtain the necessary consent. As an illustrative example, imagine that a father would like to use a client-based family locator to see the location of his child's phone, but must first obtain the child's cooperation and consent to install (and keep installed) the service's app on the child's phone.

Consent in a client-based model can actually be multi-faceted. First, installation of the app itself is a gating moment. A mobile device holder who does not wish to participate in the service in question can choose to remove the app, or choose not to install the app in the first place. Second, the OS typically asks the mobile device holder for explicit consent (at installation and/or runtime and/or periodically thereafter) before letting the app access location-related APIs. Third, OSes may have global permission settings that allow the mobile device holder to temporarily turn off underlying location subsystems on the mobile device. In all of these cases, it is typically the mobile device holder's that provides the consent and cooperation to allow the mobile device to share its location.

The location information provided by the OS to the app typically has low latency, good precision, and high granularity. Therefore, client-based location techniques are typically seen as having superior performance compared to network-based location. The level of control afforded to the mobile device holder is also seen as a positive, in some circumstances.

However, the ability, and perhaps necessity, for the mobile device holder to control consent can also be seen as a negative in some circumstances. For instance, the installation of an app on each mobile device is often seen as an undesirable hurdle or time-consuming burden. As an illustrative example, it would be frustrating for a person to learn upon losing his or her phone that it would have been possible to locate the now-missing phone using a client-based Lost Phone service . . . if only they had had the foresight to install that service's app on the phone, and had granted all of the necessary permissions before misplacing their phone. In the all-too-common case that the person didn't have this foresight, a network-based Lost Phone service would be superior.

The systems and methods described herein combine network-based location and client-based location into a distributed hybrid approach that takes advantage of the strengths of both. In conceiving and developing the system and methods, the inventors recognized and overcame a number of problems. Included in these problems are:

1. Tracking and reconciling the differing consents that come with each of the location sources.
2. Determining which consents to respect in different situations.
3. Choosing the optimal location source in different situation.
4. How to solve problems 1-3 in a sensible way that is coherent and consistent for participants in the system.

The systems and methods disclosed herein provide a hybrid location service that in some embodiments, uses client-based location when available, treats network-based location as a fallback, implements an additional in-app permission system, and implements an "emergency override" mode that is consistent with a combined network-plus-client consent model. The result is a solution that reconciles performance and user consent tradeoffs in a distributed hybrid location sharing service in a way that makes sense to users of the system. Further, the systems and methods disclosed herein keep track of each user as they pass through various user states ("invited," "participating," "paused," and "tampered") and to introduce an additional mode of operation into the product ("emergency override"). This, combined with a system to keep track of location consents (at the network level and the client level) presents a solution for integrating the various location sources and their consent systems into a distributed hybrid approach that is coherent and consistent for users of the system, without requiring the users to have knowledge of the underlying location techniques being used. Thus, the people using the location sharing service need not understand the nuances of the different location techniques in order to share and see location information.

Figure 1:
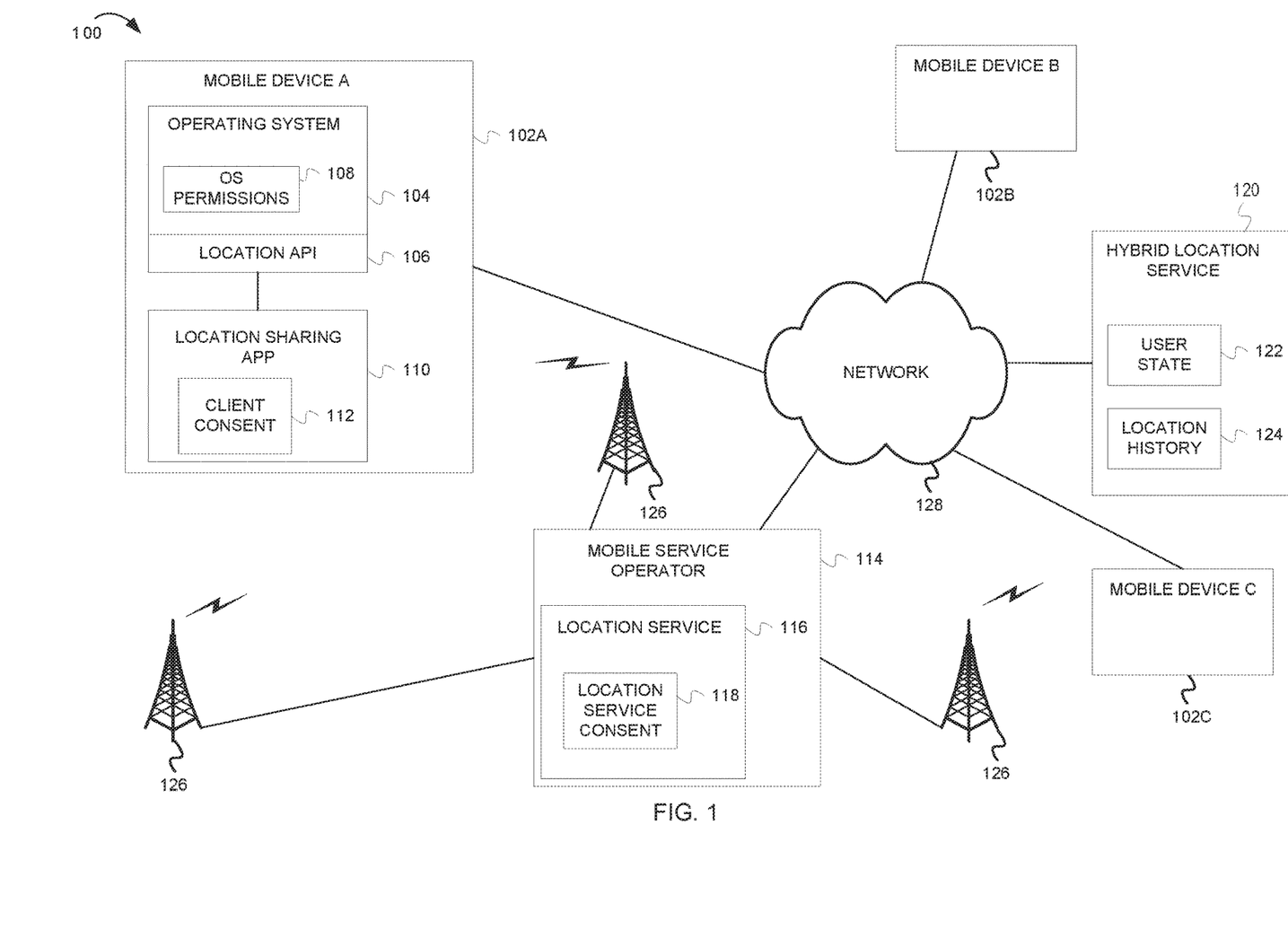
FIG. 1 is a block diagram of a system according to embodiments.

FIG. 1 is a block diagram of a system 100 to determine user consent for a hybrid location service. In some aspects, system 100 includes mobile device A 102A, mobile device B 102B, mobile device C 102C, mobile service operator 114, and a hybrid location service 120.

Mobile devices 102A-C will be referred to generically as mobile device 102. A mobile device 102 can be a smart phone, tablet device, laptop computer or other device that is capable of providing location information, or for which location information can be derived. Mobile device 102 can include an operating system 104 and a location sharing application 110. In some embodiments, the operating system 104 can be a version of the Android operating system. In alternative embodiments, the operating system can be the iOS operating system. Other mobile device operating systems now known or developed in the future can be used and are within the scope of the inventive subject matter. While the example system 100 illustrated in FIG. 1 shows three mobile devices, those of skill in the art will appreciate that there may be more or fewer mobile devices 102 in the system.

Operating system 104 can include a location application program interface (API) 106 that can provide a software interface to applications such as location sharing application 110 allowing such applications to utilize location information maintained by a location subsystem (not shown) of operating system 104.

OS permissions 108 can include a set of permission to determine whether applications have access to information provided by the location subsystem of operating system 104.

Location sharing app 110 is an application on a mobile device that can share a mobile device's location information, and can view location information associated with other mobile devices. In some embodiments, location sharing app 110 can obtain location information about other mobile devices from hybrid location service 120.

Mobile service operator 114 is a provider of network services to a mobile device. For example, mobile service operator 114 can provide cellular phone service to mobile devices 102. Examples of such mobile service operators are Verizon, AT&T, Sprint, T Mobile etc. Mobile service operator 114 can provide a network-based location service 116. As discussed above, the network-based location service 116 can approximate a mobile device's 102 location by triangulating signal strength or round trip signal times between the mobile device 102 and one or multiple nearby cell signal towers 126. Location service consent 118 can be maintained by a mobile service operator 114. Location service consent 118 comprises information as to whether an account holder has consented for network-based location information to be shared.

Hybrid location service 120 is a location service to users that can provide location information from either or both a network location-based source or a client location-based source. Hybrid location service 120 can maintain a user state 122 and a location history 124 for users of the hybrid location service.

User state 122 indicates a current state for a user. In some embodiments, the user state can be one of the following states:

Invited—The user has been added to the system (for example by being invited to participate by another user who is already using the hybrid location service 120) but has not yet downloaded and set up the app 110 on their mobile device 102.

Participating—An invited user who successfully downloads and sets up the app 110 onto their mobile device 102 is participating. Part of this setup involves giving client-based consent to share location via the app 110.

Paused—A participating user may use in-app controls, if present, to restrict their location sharing. A user who still has the app 110 installed and has otherwise given client-based consent, but is currently using in-app controls to restrict their location sharing, is considered paused.

Tampered—A participating user who removes the app 110, revokes OS-level permissions 108, tampers with the mobile device 102 settings to prevent location sharing, or otherwise revokes client-based consent (beyond any pause controls present within the app 110) is considered in a tampered state. Client-based location sharing may be degraded or restricted altogether.

In some embodiments, the states are mutually exclusive.

All four of these states can be meaningfully different to the user in question and to any other users they are using the service with. For instance, the UI of location sharing app 110 may label which state each user is in, and might provide different functionality based on which state each user is in. For example, a participating user may see a "pause" button in their UI whereas a paused user may see a "resume sharing" button in their UI. Similarly, other users may see, a "send another invitation" button next to an invited user, whereas they may see an "ask to share again" button next to a paused user.

Figure 2:
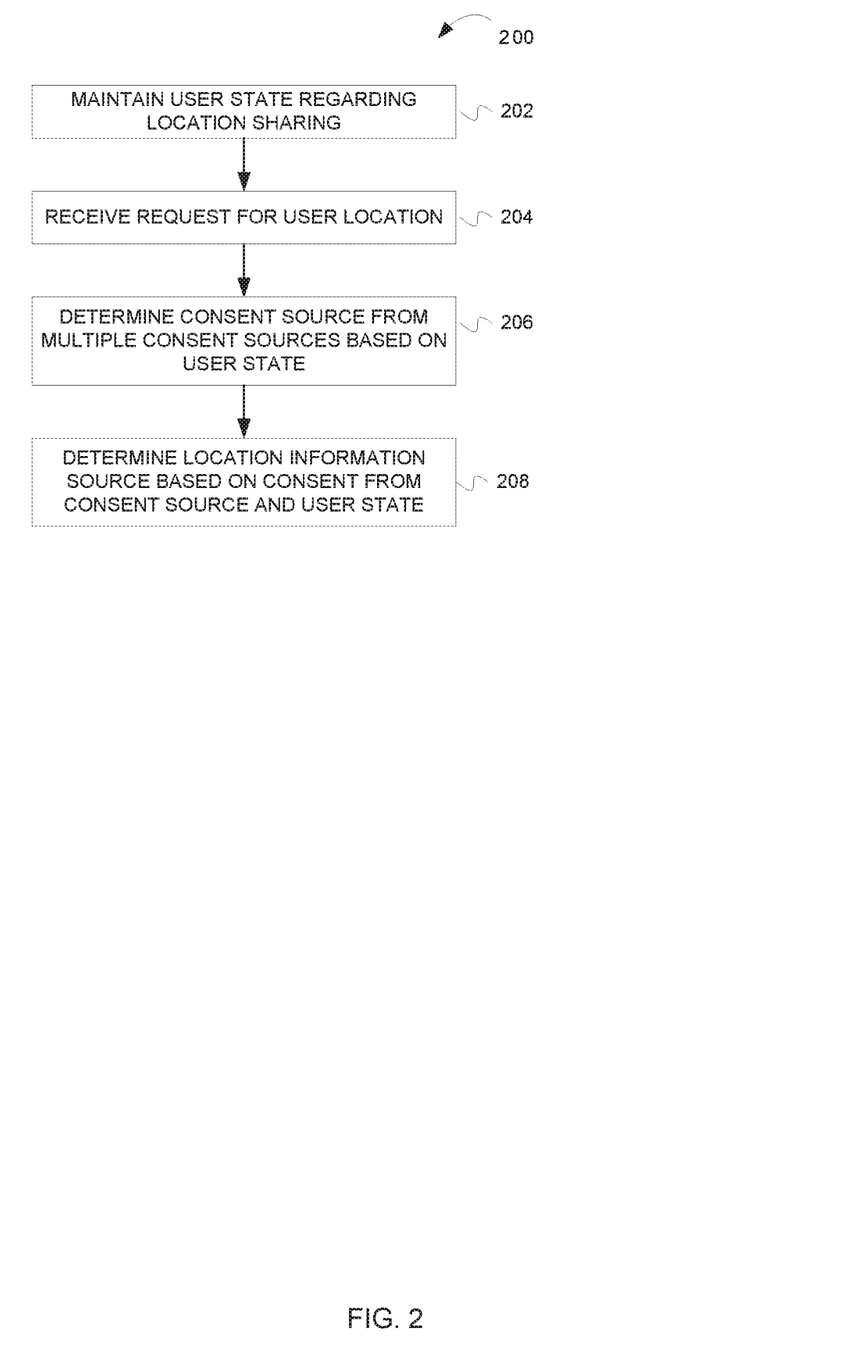
FIG. 2 is a flow chart describing a method for determining a mobile device location in a hybrid location service.
Figure 3:
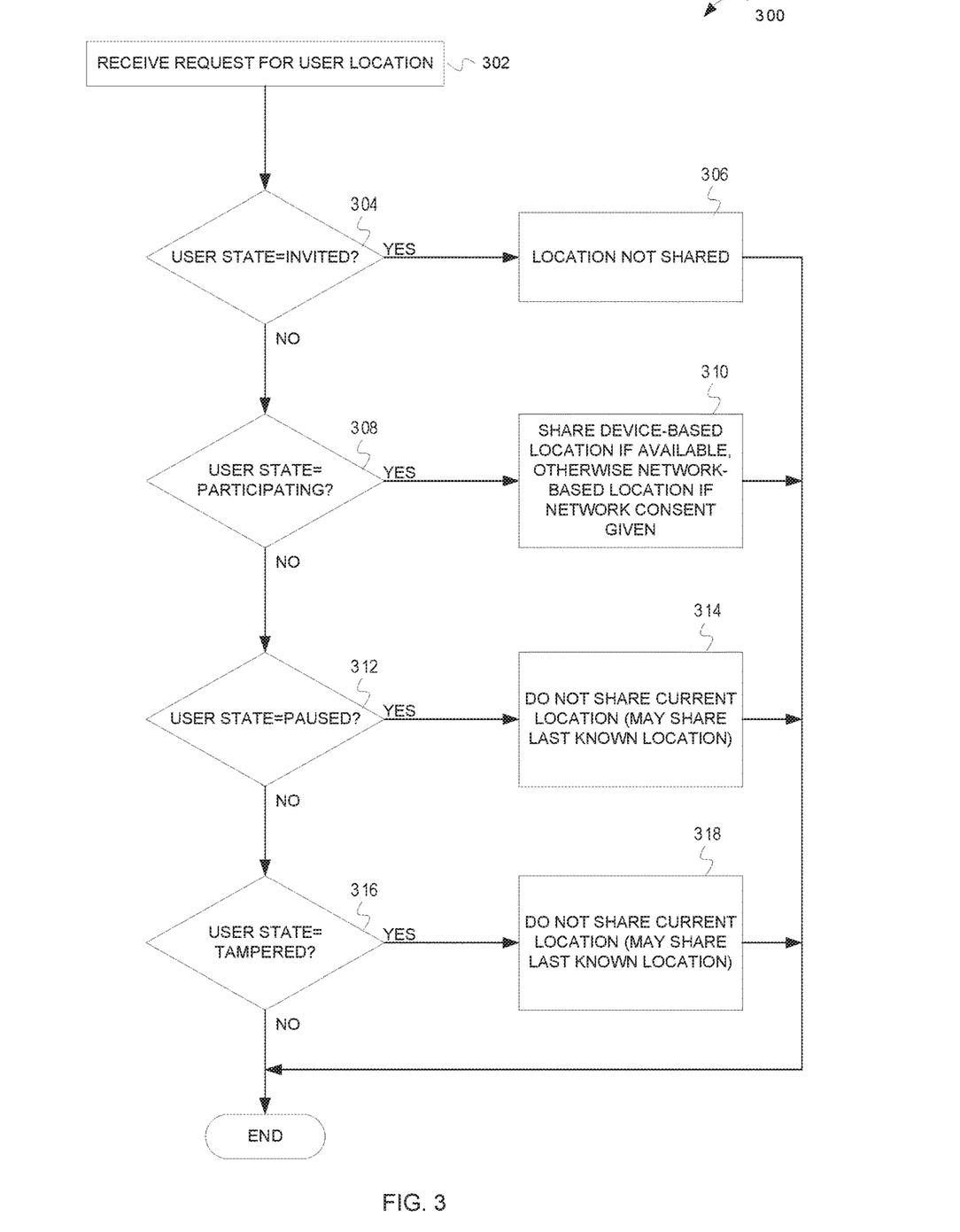
FIG. 3 is a flow chart providing further details of the method for determining a mobile device location in a normal mode.
Figure 4:
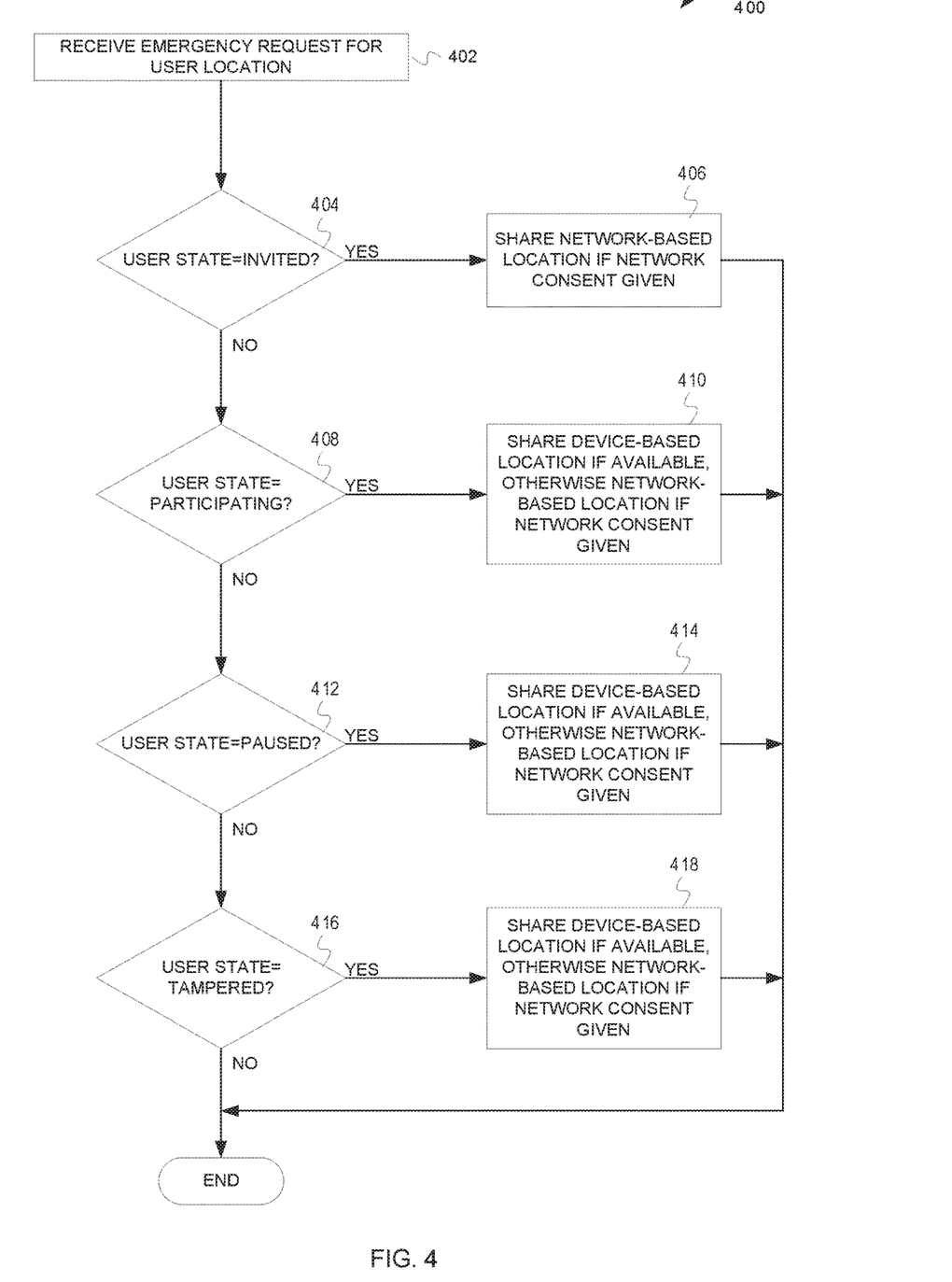
FIG. 4 is a flow chart providing further details of the method for determining a mobile device location in an emergency override mode.

FIG. 2-4 are flowcharts describing methods for determining a mobile device location in a hybrid location service according to embodiments. The methods may, in some aspects, constitute computer programs made up of computer-executable instructions. Describing the method by reference to a flowchart enables one skilled in the art to develop such programs including such instructions to carry out the method on suitable processors (the processor or processors of the computer executing the instructions from computer-readable media). The methods illustrated in FIGS. 2-4 are inclusive of acts that may be taken by an operating environment 100 executing an example embodiment of the invention.

FIG. 2 is a flow chart 200 describing a method for determining a mobile device location in a hybrid location service.

At block 202, a hybrid location service 120 maintains a user state regarding location sharing mobile devices. The user states for the mobile devices can be one of the user states 122 described above.

At block 204, the hybrid location service 120 receives a request for a location of a mobile device. The request can be received for example, from a location app on another mobile device, or from a web interface of a browser on a mobile device, table computer, laptop computer, desktop computer, server computer etc. In some embodiments, a user of a location app can request the location of another mobile device directly, for example, by selecting the desired mobile device and pressing a "Locate" button. In alternative embodiments, a user may implicitly request a location of other mobile devices by viewing a map display showing the locations of other mobile devices on a mobile device app or web application.

At block 206, the hybrid location service determines a consent source from multiple consent sources based, at least in part, on a user state. For example, a consent source can be a client-based consent 112 or a network location-based service consent 118. The consent sources can be physically separated from one another.

At block 208, the hybrid location service determines a location information source from multiple location sources based on the user state and the consent information obtained at block 206. In some embodiments, the hybrid location service can request location information from a mobile device application and/or a network service depending on the consent information and user state. The hybrid location service can issue requests to both the mobile device application and the network service either simultaneously or in sequence. In alternative embodiments, the hybrid location service can use recently obtained locations along with quality and latency information associated with the recently obtained locations to determine whether to use such recently obtained locations to respond to the location request.

In some embodiments, based on user consent, client applications may also elect to push location information to the hybrid location server, independent of any request from another user or application. The conditions under which the unsolicited location is sent may vary, and include, but are not limited to: periodically (e.g. every hour), when the client application is directly in use by a user on that mobile device, when accelerometer events fire, when the user turns on the screen, when other applications on the device request location, when the phone is attached or detached from a charger, when a geofence is entered or exited, when the user's battery reaches a certain low threshold, or the phone is initially powered on. The hybrid location server can store the unsolicited location information and use the location information as described above to respond to location requests.

Further details on the method will now be provided with reference to FIGS. 3 and 4.

FIG. 3 is a flow chart 300 providing further details of the method for determining a mobile device location in a normal mode. As used herein, a normal operating mode refers to the default state of the service. At block 302, a hybrid location service receives a request for a user location (i.e., a location of the user's mobile device 102). As described above with respect to block 202 (FIG. 2), The request can be received for example, from a location app on another mobile device, or from a web interface of a browser on a mobile device, table computer, laptop computer, desktop computer, server computer etc.

At block 304, the hybrid location service determines if the user state associated with the mobile device 102 is "Invited".

If the user state is "Invited", the method proceeds to block 306, where the hybrid location service does not provide a location to the requester. During normal operations, an invited user appears within the location sharing app 110, but may be presented in such a way as to indicate that they are invited and not yet fully participating. In the context of location sharing services, the invited user is not yet sharing their location in normal operations.

If the user state is not "Invited," then at block 308, the hybrid location service 120 checks to determine if the user state is "Participating." If so, the method proceeds to block 310, where location information is shared. Once a user is participating, they are presented as fully joined into the service and their location begins being shown as shared within the service. The location information can include device-based location information, if available. It can also include network-based location information, if network-based consent has been granted for the user in question. Additionally, an avatar representing the participating user may appear on a map view seen by users they are sharing their location with.

If the user state is not "Participating,", then at block 312, the hybrid location service 120 can check to determine if the user state is "Paused." If so, then the method proceeds to block 314, where the hybrid location service does not share a current location. During normal operations, a paused user is no longer sharing their location information. The UI on the requesting application may choose to show their last known location and/or timestamp as of the moment they became paused, or may remove all historical location and/or temporal information altogether.

If the user state is not "Paused,", then the method proceeds to block 316, where a check is made to determine if the user state is "Tampered." If so, the method proceeds to block 318, where in some embodiments, location information is not shared. During normal operations, a tampered user may or may not be sharing location information, depending on the severity and details of actions the user has taken to revoke consent and functionality. The UI on the requesting application may choose to show their last known location and/or timestamp as of the moment they became tampered, or may remove all historical location and/or temporal information altogether.

FIG. 4 is a flow chart providing further details of the method for determining a mobile device location in an emergency override mode. The emergency override mode presents an alternative to normal operating mode in cases where location is urgently needed. In some embodiments, the ability to initiate emergency override mode can be restricted to just one primary user. In alternative embodiments, the ability to initiate emergency override mode can be limited to a subset of users (i.e., "admins"). In further alternative embodiments, emergency override mode can be initiated by anyone who is using the hybrid location service 120.

At block 402, a hybrid location service 120 receives an emergency override request for a user location (i.e., a location of the user's mobile device 102). As described above with respect to block 202 (FIG. 2), The emergency override request can be received for example, from a location app on another mobile device, or from a web interface of a browser on a mobile device, table computer, laptop computer, desktop computer, server computer etc.

At block 404, the hybrid location service determines if the user state associated with the mobile device 102 is "Invited". If the user state is "Invited", then the method proceeds to block 406, where the hybrid location service provides a location to the requester. Unlike normal operating mode, in emergency override an invited user's location is shared as long as network-based consent has been granted for the user in question. By definition these invited users haven't yet downloaded and successfully installed the service's app on their device, so the location information shared in this case will generally be network-based. If network-based consent has not been granted, the app may make the UI for obtaining that consent more prominent on the mobile device 102 receiving the request. Additionally, the app can cause the mobile device to provide a visual, auditory, or vibrating alert to draw attention to the request.

If the user state is not "Invited," then at block 408, the hybrid location service 120 checks to determine if the user state is "Participating." If so, the method proceeds to block 410, where location information is shared. As in normal operating mode, users in the participating state continue to share their location in emergency override. This location information can include device-based location information, if available. It can also include network-based location information, if network-based consent has been granted for the user in question. If network-based consent has not been granted, the app may make the UI for obtaining that consent more prominent on the mobile device 102 receiving the request. Additionally, the app can cause the mobile device to provide a visual, auditory, or vibrating alert to draw attention to the request.

If the user state is not "Participating,", then at block 412, the hybrid location service 120 can check to determine if the user state is "Paused." If so, then the method proceeds to block 414, where the hybrid location service shares a current location. Unlike normal operating mode, in emergency override a paused user's location is shared. In some embodiments, this location information can include client-based location information, if available. This location information can also include network-based location information, if network-based consent has been granted for the user in question. If network-based consent has not been granted, the app may make UI for obtaining that consent more prominent on the mobile device 102 receiving the request. Additionally, the app can cause the mobile device to provide a visual, auditory, or vibrating alert to draw attention to the request. In alternative embodiments, network-based information is shared, but client-based location information is not shared. In such embodiments, the determination not to share client-based location information may be based on shifting a balance towards respecting client-based consent at the possible expense of some performance.

If the user state is not "Paused,", then the method proceeds to block 416, where a check is made to determine if the user state is "Tampered." If so, the method proceeds to block 418, where in some embodiments, location information is shared. Unlike normal operating mode, in emergency override mode, a tampered user's location is shared. In some embodiments, this location information can include client-based location information, if available. This location information can also include network-based location information, if network-based consent has been granted for the user in question. If network-based consent has not been granted, the app may make the UI for obtaining that consent more prominent on the mobile device 102 receiving the request. Additionally, the app can cause the mobile device to provide a visual, auditory, or vibrating alert to draw attention to the request. In alternative embodiments, network-based information is shared, but client-based location information is not shared. In such embodiments, the determination not to share client-based location information may be based on shifting a balance towards respecting client-based consent at the possible expense of some performance.

Those of skill in the art having the benefit of the disclosure will appreciate that the order of user status determinations presented in FIGS. 3 and 4 is not important and can be different than that illustrated in the Figures.

Variations in Alternative Embodiments

Aspects of certain embodiments have been provided above. Further aspects of alternative embodiments will now be presented.

In some embodiments, location information can include historical stored data, sometimes referred to as "last known location." In the case of a user who is in the paused state: the location sharing app 110 may choose not to show historical location in normal operations, but could choose to disclose that historical location data in emergency override mode.

For example, a hybrid location service 120 may be implemented such that the location sharing app 110 continues to report client-based location information to the hybrid location service 120 and/or the service may periodically requests network-based location information, even while a user is in the paused state. The location sharing app 110 may not show this location information in normal operating mode, consistent with the rules of the paused state, but would then have possibly valuable location data to share in the event of an emergency override mode.

In some embodiments, if the hybrid location sharing service is for use with more than one person (e.g., a family locator product), the emergency override applies to one person at a time (i.e. person A's location sharing may be governed by emergency override mode while person B, in the same group, is still in normal operating mode). In alternative embodiments, the emergency override mode applies to multiple users at once or even the whole group (e.g., all of the members of a family at once).

In some embodiments, the emergency override mode can optionally be implemented to trigger certain notifications or other UI changes to inform users that emergency override mode has been initiated. For example, a text message or push notification could be sent to any user affected by emergency override. These embodiments seek to balance users' need for location information in an emergency with individuals' privacy concerns.

In some embodiments, emergency override is constructed as a mode that can be toggled on and off. In some implementations the user can turn it on. Emergency override could turn "off" upon user intervention, or can be implemented to automatically turn off ("expire") after a set amount of time or after the current user session. In some embodiments, a session can be the time during a screen lock. The default behavior during a screen lock can be set to respond to an emergency override or not respond to an emergency override. The emergency override can be blocked for a certain amount of time; or emergency override can be set for a particular time the screen is locked, but will reset the next time the screen is locked.

As noted above, in some embodiments, emergency override is something that can be explicitly turned on by a user. Alternative embodiments can default Invited users into emergency override mode (e.g., because they are not sharing any location information in normal operating mode anyhow). Similarly, users in the tampered state can also automatically switch to emergency override mode if so implemented.

When both network-based and client-based location is available for a given user, a heuristic can be used to determine which information to show. In some embodiments, the most recent, most precise information is given priority, with precision weighted stronger than recency within a narrow window (e.g., more recent location info wouldn't necessarily trump location info from seconds before if it was of poorer precision, but location info from 15 minutes ago might trump location info from 30 minutes ago, even if the latter is of better precision). Other heuristics to decide between network-based and client-based location can be used and are within the scope of the inventive subject matter.

As will be appreciated from the above, the embodiments can provide improvements in the functioning of location services by providing a distributed hybrid location sharing service that manages multiple consent sources to determine a location that is shared (or not shared) based on the multiple consent sources. The improved hybrid location service can implement an emergency override mode along with other modes that applies consent based rules that balance the desire for privacy with the need to determine location information in various circumstances.

Figure 5:
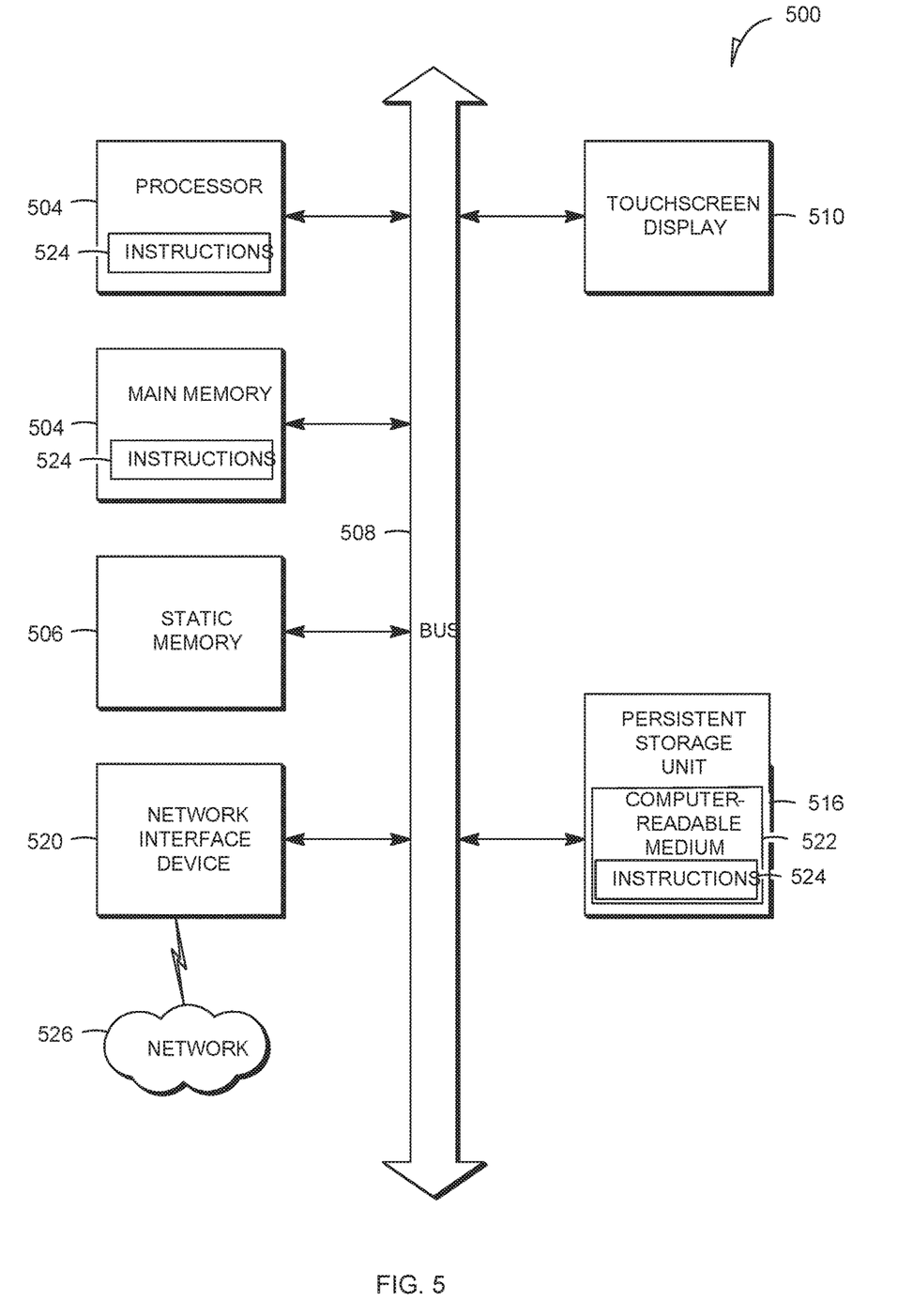
FIG. 5 is a block diagram of an example embodiment of a computer system upon which embodiments of the inventive subject matter can execute.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a touchscreen display unit 510. In example embodiments, the computer system 500 also includes a network interface device 520.

The persistent storage unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. A machine-readable storage medium does not include signals.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:
1. A method for providing mobile device location based on user consent, the method comprising:
 maintaining, by a hybrid location service, a user state for each of a plurality of mobile devices communicably coupled to the hybrid location service via one or more networks;

receiving, by the hybrid location service, a request for a location of a first mobile device of the plurality of mobile devices;

determining a consent source from a plurality of consent sources based, at least in part, on the user state of the first mobile device, wherein at least a first consent source of the plurality of consent sources is a device-based location consent maintained on the first mobile device, and wherein at least a second consent source of the plurality of consent sources is a network-based location consent maintained by a mobile service operator of at least one of the networks; and determining a response to the request for the location of the first mobile device based, at least in part, on the user state and a user consent from the consent source.

2. The method of claim 1, wherein determining the response to the request includes determining to share a device based location if the user consent indicates that consent has been provided to share the device based location and determining to share a network based location if the user consent indicates that consent has been provided to share the network based location.

3. The method of claim 1, wherein determining the response to the request includes determining to share a previous location of the first mobile device if the user consent indicates that consent has not been provided to share a device based location or a network based location.

4. The method of claim 1, wherein determining the response to the request includes determining not to share a current location of the first mobile device in response to detecting that the first mobile device is in a tampered state.

5. The method of claim 4, further comprising determining that the user state comprises the tampered state in response to determining that a location app has been removed from the first mobile device.

6. The method of claim 1, wherein the request comprises an emergency request, and wherein determining the response to the request includes sharing a device based location if the device based location is available and the user consent indicates that consent has been provided to share the device based location and sharing a network based location if the user consent indicates that consent has not been provided.

7. The method of claim 1, wherein the request comprises an emergency request, and further comprising:

causing a user interface for providing consent to be displayed more prominently on the first mobile device receiving the emergency request in response to determining that at least one of consent to share device based location or consent to share network based location has not been provided.

8. A non-transitory machine-readable medium having stored thereon computer executable instructions for providing mobile device location based on user consent, the computer executable instructions to cause one or more processors to perform operations comprising:

maintain, by a hybrid location service, a user state for each of a plurality of mobile devices communicably coupled to the hybrid location service via one or more networks;

receive, by the hybrid location service, a request for a location of a first mobile device of the plurality of mobile devices;

determine a consent source from a plurality of consent sources based, at least in part, on the user state of the first mobile device, wherein at least a first consent source of the plurality of consent sources is a device-based location consent maintained on the first mobile device, and wherein at least a second consent source of the plurality of consent sources is a network-based location consent maintained by a mobile service operator of at least one of the networks; and determine a response to the request for the location of the first mobile device based, at least in part, on the user state and a user consent from the consent source.

9. The non-transitory machine-readable medium of claim 8, wherein the computer executable instructions to determine the response to the request include computer executable instructions to determine to share a device based location if the user consent indicates that consent has been provided to share the device based location and determine to share a network based location if the user consent indicates that consent has been provided to share the network based location.

10. The non-transitory machine-readable medium of claim 8, wherein the computer executable instructions to determine the response to the request include computer executable instructions to determine to share a previous location of the first mobile device if the user consent indicates that consent has not been provided to share a device based location or a network based location.

11. The non-transitory machine-readable medium of claim 8, wherein the computer executable instructions to determine the response to the request include computer executable instructions to determine not to share a current location of the first mobile device in response to detecting that the first mobile device is in a tampered state.

12. The non-transitory machine-readable medium of claim 11, wherein the computer executable instructions further comprise computer executable instructions to determine that the user state comprises the tampered state in response to a determination that a location app has been removed from the first mobile device.

13. The non-transitory machine-readable medium of claim 8, wherein the request comprises an emergency request, and wherein the computer executable instructions to determine the response to the request include computer executable instructions to share a device based location if the device based location is available and the user consent indicates that consent has been provided to share the device based location and to share a network based location if the user consent indicates that consent has not been provided.

14. The non-transitory machine-readable medium of claim 8, wherein the request comprises an emergency request, and wherein the computer executable instructions further comprise computer executable instructions to:

cause a user interface for providing consent to be displayed more prominently on the first mobile device receiving the emergency request in response to a determination that at least one of consent to share device based location or consent to share network based location has not been provided.

15. An apparatus for providing mobile device location based on user consent, the apparatus comprising:

one or more processors; and a non-transitory machine-readable medium having stored thereon computer executable instructions to cause the one or more processors to:

maintain, by a hybrid location service, a user state for each of a plurality of mobile devices communicably coupled to the hybrid location service via one or more networks;

receive, by the hybrid location service, a request for a location of a first mobile device of the plurality of mobile devices;

determine a consent source from a plurality of consent sources based, at least in part, on the user state of the first mobile device, wherein at least a first consent source of the plurality of consent sources is a device-based location consent maintained on the first mobile device, and wherein at least a second consent source of the plurality of consent sources is a network-based location consent maintained by a mobile service operator of at least one of the networks; and determine a response to the request for the location of the first mobile device based, at least in part, on the user state and a user consent from the consent source.

16. The apparatus of claim 15, wherein the computer executable instructions to determine the response to the request include computer executable instructions to determine to share a device based location if the user consent indicates that consent has been provided to share the device based location and determine to share a network based location if the user consent indicates that consent has been provided to share the network based location.

17. The apparatus of claim 15, wherein the computer executable instructions to determine the response to the request include computer executable instructions to determine to share a previous location of the first mobile device if the user consent indicates that consent has not been provided to share a device based location or a network based location.

18. The apparatus of claim 15, wherein the computer executable instructions to determine the response to the request include computer executable instructions to determine not to share a current location of the first mobile device in response to detecting that the first mobile device is in a tampered state.

19. The apparatus of claim 18, wherein the computer executable instructions further comprise computer executable instructions to determine that the user state comprises the tampered state in response to a determination that a location app has been removed from the first mobile device.

20. The apparatus of claim 15, wherein the request comprises an emergency request, and wherein the computer executable instructions to determine the response to the request include computer executable instructions to share a device based location if the device based location is available and the user consent indicates that consent has been provided to share the device based location and to share a network based location if the user consent indicates that consent has not been provided.

21. The apparatus of claim 15, wherein the request comprises an emergency request, and wherein the computer executable instructions further comprise computer executable instructions to:

cause a user interface for providing consent to be displayed more prominently on the first mobile device receiving the emergency request in response to a determination that at least one of consent to share device based location or consent to share network based location has not been provided.

* * * * *